United States Patent Office 3,365,469
Patented Jan. 23, 1968

3,365,469
2-ARYLMETHYLPYROMECONIC ACIDS
Bryce E. Tate, Niantic, and Robert P. Allingham, Groton, Conn., assignors to Chas. Pfizer & Co., Inc., New York, N.Y., a corporation of Delaware
No Drawing. Continuation-in-part of application Ser. No. 310,141, Sept. 19, 1963. This application Nov. 1, 1966, Ser. No. 591,127
2 Claims. (Cl. 260—345.9)

The present invention is in part a continuation of copending application Serial No. 310,141, filed September 19, 1963, now abandoned.

This invention relates to new and valuable organic compounds and to their use as flavor and aroma enhancers for edibles, aroma enhancers for perfumes and as antimicrobial agents. More particularly, it is concerned with the processes for the improvement of the flavor and aroma of foods and beverages, and the aroma of perfumes, which comprises the addition of a 2-arylmethylpyromeconic acid to such foods, beverages and perfumes. This invention also concerns the method for inhibiting the growth of microbes which comprises the addition of a 2-arylmethylpyromeconic acid to the locus of said microbes.

The new and valuable compounds of this invention are those of the formula:

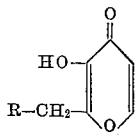

where R is phenyl, naphthyl, substituted phenyl or substituted naphthyl and each of said substituents is alkyl having from 1 to 6 carbon atoms, hydroxy, chlorine, bromine, iodine or alkoxy having from 1 to 6 carbon atoms.

The 2-arylmethylpyromeconic acids of this invention are prepared by a modification of the process disclosed and claimed in U.S. Patent 3,130,204 issued to Bryce E. Tate and Robert L. Miller. The compounds are prepared by reacting pyromeconic acid with an aryl aldehyde and thereafter reducing the intermediate 2-(1-hydroxy-1-arylmethyl)pyromeconic acid, obtained. This process is carried out according to the following sequence:

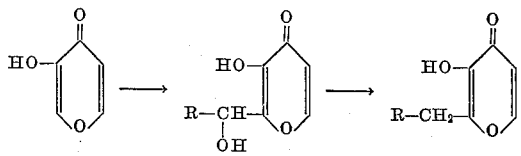

where R is as aforesaid.

The conversion of pyromeconic acid to 2-(1-hydroxy-1-arylmethyl)pyromeconic acid is accomplished in excellent yield, by carrying out the reaction at a pH of above about 5, and preferably above about 8. Of course, as is obvious to those skilled in the art, with an aryl aldehyde it is desirable to use a water-miscible solvent to provide for more intimate mixing of the reagents. Dioxane is a useful solvent in this step. Bases such as sodium hydroxide, potassium hydroxide, lithium hydroxide and the like can be used for bringing the pH of the reaction mixture to above at least 5. For optimum yields, it is preferred to limit the amount of aldehyde added, to one mole equivalent based on the pyromeconic acid. The use of an excess of aldehyde may decrease the purity of the product if an aqueous medium is employed.

The following represents a preferred embodiment of Step 1 in the process: Pyromeconic acid is added to about 4 times its weight of water and to the desired mixture is added sufficient 50% by weight aqueous base solution to bring the pH of the resulting mixture to about 10. To this solution is added one mole equivalent of the aldehyde dissolved in minimum volume of dioxane. The resulting mixture is stirred at 50° C. for about 18 hours, then is cooled and adjusted to pH 2 with strong acid. Cooling the reaction mixture to about 5° C. causes the desired product to precipitate, in crystalline form, from the reaction mixture, from which it is recovered by filtration.

With respect to Step 2, the conversion of 2-(1-hydroxy-1-arlymethyl)pyromeconic acid to the corresponding 2-arylmethylpyromeconic acid, is carried out under acidic to substantially neutral conditions. If such a reaction is attempted in an alkaline medium, wherein the said hydroxy-substituted-pyromeconic acid species is predominately of the anion form, the yield of product is very low after treatment of the solution with a reducing agent. A number of reducing means may be employed in this step, for example, a zinc-hydrochloric acid combination or similar metal-acid combination or, alternatively, chemical reducing agents, or hydrogen and a catalyst may be used. With respect to the embodiment of metal-acid combinations as the reducing agent, it has been found that zinc, iron, aluminum, tin, magnesium, and the like, are effective to displace hydrogen from the acid. It is especially preferred to use zinc since this metal in addition to its economic advantage has a tendency to provide products with somewhat higher purity and lighter color. Mineral, or monocarboxylic saturated open-chain aliphatic acids having from one to ten carbon atoms and which are soluble in the reaction system, can be employed in combinations with metals of the aforesaid type. Among the aliphatic acids which are particularly effective are formic and acetic. It is especially preferred to use hydrochloric acid in this step since the compound formed has a tendency to be obtained in higher yield and higher purity.

Step 2 is accomplished by adding about one volume of 2-(1-hydroxyl-1-arylmethyl)pyromeconic acid to about 5 volumes of water and treating the suspension with enough strong acid, for example, sulfuric or hydrochloric, to bring the pH to below about 5. The slurry is then heated to about 50–55° C. and an amount of zinc dust is added equivalent to about 2 moles per mole of compound to be reduced. Although this is a 100% excess, with certain grades of zinc dust, less may be required. The reason for the variation in efficiency between certain grades of zinc dust is not clearly understood at the present time. In some cases 1.3 moles of zinc per mole of substituted pyromeconic acid has been found to be sufficient. The reaction mixture is then stirred vigorously and an aqueous solution of about 10 N hydrochloric acid containing at least a stoichiometrically-equivalent amount of acid based on the hydroxy intermediate, is slowly added over a period of about 1 hour. After all the acid has been added the reaction mixture is maintained at about 55–60° C. for from about 3 to about 5 hours. The mixture is then filtered while it is hot, then is cooled and the crystalline product which forms is collected.

Since 2-arylmethylpyromeconic acids contain acidic hydrogen, in addition to the free acids, it is intended to include within this invention alkali addition salts of the compounds. These salts are formed in the usual manner, for example, by reacting the new compounds with a base, such as alkali metal hydroxides, alkaline earth metal hydroxides or an organic base. Especially useful salts are those of sodium, potassium, calcium and ammonia.

Broadly, this invention covers novel compounds having the formula:

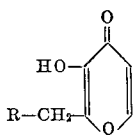

where R is phenyl, naphthyl, substituted phenyl or substituted naphthyl and each of said substituents is alkyl having from 1 to 6 carbon atoms, hydroxy, chlorine, bromine, iodine or alkoxy having from 1 to 6 carbon atoms. Specifically contemplated is the compound where R is phenyl.

Also contemplated in this invention is a method of enhancing the aroma of edibles and perfumes and the flavor of edibles which comprises adding an effective concentration of one of the aforesaid compounds thereto and, more specifically, adding from about 1 to about 500 parts per million by weight of the compound thereto.

Further contemplated in this invention are edibles and perfume compositions containing as flavor and aroma enhancers, one of the aforesaid compounds and, more specifically, 2-benzylpyromeconic acid.

Also, contemplated in this invention is the method for inhibiting microbial growth which comprises adding an inhibiting amount of one of the aforesaid compounds to the locus of said microbes and, more specifically, adding from about 2 to about 10,000 parts per million by weight of said compound.

This invention also contemplates antimicrobial compositions comprising one of the aforesaid compounds and a carrier.

With respect to enhancing the aroma and flavor of edibles, particular mention is made of the especially desirable increase in appeal which is obtained when the 2-arylmethylpyromeconic acids are added in amounts to provide from about 1 to about 500 parts per million by weight. It is observed that below about 1 part per million there is a tendency for some people to have difficulty in discerning the beneficial effect of the addition and that above about 500 p.p.m. some begin to notice an aroma effect contributed by the acids themselves. It is obvious to those skilled in the art to which this subject matter pertains that for varying purposes varying amounts are required, which may be determined by experimentation. Thus, in some products test subjects have difficulty in discerning 5 p.p.m. and also in some products less desirable effects observed above about 100 p.p.m. With respect to enhancing the aroma of perfumes, generally the same levels of 2-arylmethylpyromeconic acid, as in food, can be employed. As will be understood by those skilled in the art, the precise amount of acid to be added will depend on the desired strength of the perfume odor itself. It is found that 2-benzylpyromeconic acid has a slightly-sweet, floral odor itself and contributes this odor to perfumes giving them a longer-lasting effect. In addition, it has been found that the addition of this compound to perfumes strengthens the aroma of the perfume by as much as 15%.

With respect to the term edibles, used herein and in the appended claims, it is contemplated to include compositions which are ordinarily eaten or drunk. For example, 2-benzylpyromeconic acid is particularly effective in enhancing the flavor and aroma of chocolate and vanilla products, candies, ice cream, cake mixes, cookies, pies, desserts, fruit juices, wines, liqueurs and flavor extracts. Furthermore, it can be used as flavor and aroma component in canned and frozen fruits and vegetables, meat and fish products, cereals, macaroni and noodle products, soups, sauces and seasonings, prepared dressings and breads. In addition, among the edibles which can be benefitted by the process of the instant invention are pharmaceutical oral dosage forms, animal feeds and pet foods. With respect to the term perfumes, as used herein and in the appended claims, it is meant to include concentrated essences, colognes, and industrial odorants which are commonly used in cosmetic and hygienic products, such as detergents and soaps, and in the perfuming of tobacco, paper, textiles, printing inks, food packages, paints, home deodorants and insecticides.

The 2-arylmethylpyromeconic acids of this invention, at very low levels, strengthen the flavor and aroma of a wide variety of products. They develop inherent flavors and create, especially in sweet foods, a "velvet mouth sensation." Because they so strongly augment many inherent flavors, as for instance, to achieve optimum taste; these reformulations are well within the capability of those skilled in the art. The compounds of this invention may be added to the food or perfume directly in the dry form or, alternatively, as solutions. Care should be taken to obtain even distribution through the use of pre-mixing if necessary, since such small quantities have such a powerful effect.

It has been found that the 2-arylmethylpyromeconic acids prepared as described hereinbefore have antimicrobial properties. This property is particularly valuable since it is a matter of common knowledge and experience that uncontrolled microbial growth is responsible for serious economic losses through food damage and in numerous instances of disease in man and in animals. In the past, it has been proposed to add many chemical agents to foods or to other substances to prevent the destruction thereof by the uncontrolled growth of microbes therein. Furthermore, infections in humans and animals have been controlled by the administration of certain substances in microbe-controlling concentrations at the site of infection in the host. In addition, microbe-controlling agents have been employed in medical diagnostic techniques and in industrial processes where it is necessary to control the growth of undesirable microbes. 2-benzylpyromeconic acid possesses a high order of activity as a microbe-controlling agent, and as a consequence, since small amounts can be used, it offers substantial economy in comparison with many previously employed chemical agents.

By the term microbe inhibiting concentration, used herein and in the appended claims, is contemplated levels of from about 10 to several thousand parts per million by weight. The effective ranges will depend on the microbe in question. In general, the low acute toxicity of these compounds allows large concentrations to be used where necessary.

The process for controlling microbial growth contemplates the addition of the compound either in the solid form or, alternatively, dissolved in solutions or in forms ordinarily used for pharmaceutical preparations. These preparations contain the compounds, if desired, in the form of a salt thereof, in admixture with a pharmaceutical organic or inorganic carrier suitable for local administration. For making the carriers there are used substances that do not react with the said 2-arylmethylpyromeconic acids, for example, water, gelatin, lactose, starches, magnesium stearate, talc, vegetable oils, benzyl alcohol, gums, polyalkylene glycols, white petrolatum or other known carriers or medicaments. The pharmaceutical preparations may be in the form of tablets, powder, salves, or creams or in liquid forms as solutions, suspensions, or emulsions. If desired, they may be sterilized and/or may contain auxiliary substances such as preserving, stabilizing, wetting or emulsifying agents.

If it is desired to use the new process in the preservation of materials such as, for example, foods, the 2-arylmethylpyromeconic acid may be incorporated into the foods by any common technique employed by those skilled in the art. For example, if it is desired to control microbial growth in baked goods such as bread, the compounds may be mixed with the dough, may be sprinkled on the surface of said bread, or may be incorporated into the bread wrapping to provide the desired microbial effect.

By the term pharmaceutically-acceptable alkali addition salts in the appended claims is meant to include the alkali metals, alkaline earth metals and ammonium salts. The more common alkali metals include sodium and potassium. The alkaline earth metals included are those of atomic number up to and including 20, i.e., magnesium, calcium, and additionally, aluminum, zinc, iron and manganese, among others.

EXAMPLE I

*2-benzylpyromeconic acid.*—In an 8-liter stainless steel vessel fitted with a stirrer and an air sparger is placed a suspension of 350 grams of kojic acid in 3500 ml. of water. The pH is adjusted to 11.1 by addition of 256 ml. of 50% aqueous sodium hydroxide and then 142 g. (7.1 g. as metal) of a 5% palladium on charcoal catalyst is added. Air is passed into the suspension at a rate of about 2100 ml. per minute. The reaction, which is slightly exothermic, is maintained at a temperature of about 20–22° C. by occasional application of external cooling. After 11 hours the reaction mixture is filtered to remove the catalyst and is treated with 600 ml. of concentrated hydrochloric acid. The crystals of comenic acid which precipitate from the pH 0.5 mixture are removed by filtration, washed with a small amount of cold water and are air-dried. There is obtained 328 g. of product. This is 85.3% of the theoretical yield. Titration data indicate the product to be 99.2% pure; therefore, there is obtained an 84.6% yield of comenic acid as corrected for purity.

In a 150-ml. Pyrex flask fitted with a mechanical stirrer and a thermometer and connected through a distillation head to a receiver are placed 10.0 g. of comenic acid, prepared as described, and 30 ml. of diphenyl ether. The reaction mixture is stirred and heated by application of a heating mantle. After about 20 minutes, the temperature reaches 225° C. and gas is observed to pass into the receiver. When the temperature reaches 245–250° C., a vigorous evolution of carbon dioxide is observed. After an additional 40 minutes at 245–250° C., the pyromeconic acid is distilled therefrom until no more passes over at an internal temperature of 255° C. and a vapor temperature of 230° C. Thirty ml. of additional diphenyl ether is added to the reaction flask and a second fraction is obtained after distillation at 255° C. internal temperature for an additional 1 hour and 10 min. The product is suspended in about 5 volumes of hexane, then is removed by filtration, and is recrystallized in 4 volumes of toluene. There is obtained 5.71 g. of pyromeconic acid, M.P. 113–115.5. Concentration of the toluene mother-liquors to about 1/20 volume affords an additional 0.7 g. of somewhat less pure pyromeconic acid. The combined weight of pyromeconic acid obtained represents an 80% conversion.

A solution of benzaldehyde, 53 g., 0.5 mole, in 175 cc. of dioxane is added to a stirred mixture of 56 g., 0.5 mole pyromeconic acid in 175 cc. of water, and sufficient 50% sodium hydroxide to give a final pH of 10.5 The temperature is maintained at 60° C. during the addition and for an additional 16 hours. The mixture is acidified (pH 2.5) with HCl and is extracted with chloroform and with ether. Evaporation of the solvents and recrystallization from ethyl acetate affords 45.5 g., 42% yield of 2-(1-hydroxy-1-phenylmethyl)pyromeconic acid, M.P. 142–143° C.

*Analysis.*—Calc'd for $C_{12}H_{10}O_4$: C, 66.05; H, 4.62. Found: C, 66.06; H, 4.81.

Concentrated HCl, 35 cc., is added dropwise over 25 minutes to a stirred mixture of 0.1 mole, 21.8 g., 2-(1-hydroxy-1-phenylmethyl)pyromeconic acid, 13.1 g., 0.2 mole zinc and 125 cc. of 25% aqueous ethanol. The temperature is maintained at 60–65° C. during addition and for an additional hour of stirring. After filtration and extraction of filtrates and filter cakes and recrystallization of crude fractions from ethyl acetate there is isolated 9.5 g., 47.5% yield, of product, M.P. 113–115° C. One additional recrystallization from ethyl acetate affords analytically pure 2-benzylpyromeconic acid.

*Analysis.*—Calc'd for $C_{12}H_{10}O_3$: C, 71.28; H, 4.99. Found: C, 71.16; H, 5.18.

The following compounds are prepared by reacting pyromeconic acid with the appropriate aldehyde according to this same procedure.

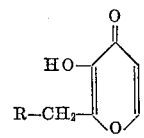

| Aldehyde | R |
|---|---|
| p-Tolualdehyde | $p\text{-}CH_3C_6H_4$. |
| 2-naphthaldehyde | $2\text{-}C_{10}H_7$. |
| 1-naphthaldehyde | $1\text{-}C_{10}H_7$. |
| 2,4-dimethyl-1-naphthaldehyde | $C_{12}H_{11}$. |
| 5-methyl-1-naphthaldehyde | $C_{11}H_9$. |
| 4-methyl-1-naphthaldehyde | $C_{11}H_9$. |
| 6-methyl-2-naphthaldehyde | $C_{11}H_9$. |
| 4-tolualdehyde | $C_7H_7$. |
| 3-tolualdehyde | $C_7H_7$. |
| 4-methoxybenzaldehyde | $4\text{-}CH_3O\text{—}C_6H_4$. |
| 3-methoxybenzaldehyde | $3\text{-}CH_3O\text{—}C_6H_4$. |
| 4-butoxybenzaldehyde | $4\text{-}C_4H_7O\text{—}C_6H_4$. |
| 2-butoxybenzaldehyde | $2\text{-}C_4H_7O\text{—}C_6H_4$. |
| 4-methoxy-1-naphthaldehyde | $4\text{-}CH_3O\text{—}1\text{-}C_{10}H_8$. |
| 6-methoxy-1-naphthaldehyde | $6\text{-}CH_3O\text{—}1\text{-}C_{10}H_8$. |
| 2-chlorobenzaldehyde | $2\text{-}Cl\text{—}C_6H_4$. |
| 2-bromobenzaldehyde | $2\text{-}Br\text{—}C_6H_4$. |
| 2-iodobenzaldehyde | $2\text{-}I\text{—}C_6H_4$. |
| 3-chlorobenzaldehyde | $3\text{-}Cl\text{—}C_6H_4$. |
| 3-bromobenzaldehyde | $3\text{-}Br\text{—}C_6H_4$. |
| 3-iodobenzaldehyde | $3\text{-}I\text{—}C_6H_4$. |
| 4-chlorobenzaldehyde | $4\text{-}Cl\text{—}C_6H_4$. |
| 4-iodobenzaldehyde | $4\text{-}I\text{—}C_6H_4$. |
| 2-chloro-1-naphthaldehyde | $2\text{-}Cl\text{—}1\text{-}C_{10}H_8$. |
| 4-chloro-1-naphthaldehyde | $4\text{-}Cl\text{—}1\text{-}C_{10}H_8$. |
| 6-chloro-1-naphthaldehyde | $6\text{-}Cl\text{—}1\text{-}C_{10}H_8$. |
| 2-bromo-1-naphthaldehyde | $2\text{-}Br\text{—}1\text{-}C_{10}H_8$. |
| 6-chloro-2-naphthaldehyde | $6\text{-}Cl\text{—}2\text{-}C_{10}H_8$. |
| 4-chloro-2-naphthaldehyde | $4\text{-}Cl\text{—}2\text{-}C_{10}H_8$. |
| 4-iodo-2-naphthaldehyde | $4\text{-}I\text{—}2\text{-}C_{10}H_8$. |
| 4-hydroxy-1-naphthaldehyde | $4\text{-}HO\text{—}1\text{-}C_{10}H_8$. |
| 5-hydroxy-1-naphthaldehyde | $5\text{-}HO\text{—}1\text{-}C_{10}H_8$. |
| 6-hydroxy-1-naphthaldehyde | $6\text{-}HO\text{—}1\text{-}C_{10}H_8$. |
| 2-hydroxybenzaldehyde | $2\text{-}HO\text{—}C_6H_4$. |
| 3-hydroxybenzaldehyde | $3\text{-}HO\text{—}C_6H_4$. |
| 4-hydroxybenzaldehyde | $4\text{-}HO\text{—}C_6H_4$. |

EXAMPLE II 2-benzylpyromeconic acid was tested against several micro-organisms in Witkin synthetic medium and found to have a minimum inhibitory concentration (mcg./ml.) of 12.5 against *P. vulgaris* and 1.56 against *E. coli*. In a B-H infusion medium, the compound had an M.I.C. of 6.25 mcg./ml. against *Strep. pyrogenes* and 3.12 mcg./ml. against *Past. multocida*.

In an agar medium 2-benzylpyromeconic acid was effective against the micro-organisms of Table I.

Table I

| Micro-organism | Percent Inhibition 10 mcg./ml. | 100 mcg./ml. |
|---|---|---|
| 1. Phytophthora citrophthora | 0 | 100 |
| 2. Sclerotinia fructicola | 0 | 100 |
| 3. Botrytis cinerea | 0 | 100 |
| 4. Geotrichum candidum | 0 | 25 |
| 5. Alternaria citri | 0 | 50 |
| 6. Diplodia natalensis | 31 | 43 |
| 7. Penicillium digitatum | 0 | 20 |
| 8. Aspergillus niger | 0 | 0 |
| 9. Fusarium oxysporum | 0 | 50 |
| 10. Phomopsis citri | 0 | 100 |
| 11. Thielaviopsis paradoxa | 11 | 73 |
| 12. Glomerella cingulata | 22 | 100 |
| 13. Rhizopus stolonifera | 0 | 38 |

When the 2-arylmethylpyromeconic acids of Example I are similiary tested, microbial growth is found to be inhibited.

EXAMPLE III 2-benzylpyromeconic acid alone is added to a perfume base solvent at 10 p.p.m. When the mixture is sprayed into an area it provides a pleasant floral aroma.

EXAMPLE IV 2-benzylpyromeconic acid is dissolved in a floral base cologne to provide 1, 50, 100, 250 and 500 p.p.m., respectively. The odors of the resulting perfume compositions are determined and compared with that of the untreated perfume as a control. The aromas of the 2-benzylpyromeconic acid-containing perfumes are significantly enhanced.

EXAMPLE V

When the products of Example I are added to vanilla ice cream at levels between 1 and 500 p.p.m., the vanilla flavor and aroma is found to be pleasingly enhanced.

EXAMPLE VI

When the products of Example I are included in a jasmine perfume base (Table I) the aroma of the perfume base is enhanced and strenghthened.

Table II

| Perfume base: | Parts |
|---|---|
| Benzyl acetate | 40 |
| Linalool | 10 |
| α-Amylcinnamic aldehyde | 10 |
| 2-arylmethylpyromeconic acid | 4 |
| Cinnamic alcohol | 5 |
| Phenylethyl alcohol | 5 |

EXAMPLE VII

The sodium salt of 2-benzylpromeconic acid is prepared by dissolving one mole of the compound in a solution of sodium hydroxide (41 grams, 1.0 mole) in 100 ml. of water. To the solution is added 1500 ml. of acetone. The resulting precipitate of the sodium salt of 2-benzylpyromeconic acid is collected and dried.

In a similar manner, the sodium salts of the compounds of Example I, are prepared. The potassium salts are prepared by replacing sodium hydroxide with potassium hydroxide in the above-described procedure and replacing acetone with isopropyl alcohol.

EXAMPLE VIII

The ferric salt of 2-benzylpyromeconic acid is prepared by dissolving 3.66 moles of ferric chloric ($FeCl_3 \cdot 6H_2O$) in 8250 ml. of water and adding 11.0 moles of 2-benzylpyromeconic acid thereto. The mixture is heated to 65° C. and the pH is adjusted to 5.5 with 50% aqueous sodium hydroxide. The mixture is then stirred at ambient temperature for 1.5 hours with the pH being readjusted to 5.5. The mixture is cooled to 34° C. and stirred at ambient temperature for 2.5 hours, cooled and filtered. The solid precipitate of the ferric salt of 2-benzylpyromeconic acid is obtained in good yield.

In the same manner, are obtained the ferric salts of the compounds of Example I.

EXAMPLE IX

The magnesium salt of 2-benzylpyromeconic acid is obtained by adding 0.01 mole of magnesium hydroxide, $Mg(OH_2)$, to a solution of 0.02 mole of the compound in 100 ml. of water. The mixture is heated to 80° C. with stirring and is filtered hot to remove insoluble impurities. The filtrate is freeze-dried to give the magnesium salt in good yield.

The aluminum salt of 2-benzylpromeconic acid is obtained by replacing magnesium hydroxide with aluminum isopropoxide in the procedure described above. The calcium salt is obtained by replacing magnesium hydroxide with calcium hydroxide.

In a similar manner the magnesium, aluminum, ammonium and calcium salts of the compounds of Example I are prepared.

What is claimed is:

1. A compound selected from the group consisting of those having the formula:

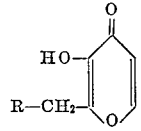

where R is phenyl, naphthyl, substituted phenyl or substituted naphthyl and each of said substituents is alkyl having from 1 to 6 carbon atoms, hydroxy, chlorine, bromine, iodine or alkoxy having from 1 to 6 carbon atoms; and the alkali addition salts thereof.

2. The compound of claim 1 wherein R is phenyl.

References Cited

UNITED STATES PATENTS 3,130,204  4/1964  Tate et al. _____ 260—345.9

OTHER REFERENCES

Index Chemicus, vol. 6, No. 5, issue 53, Sept. 15, 1962, page 16 (21189).

NORMA S. MILESTONE, *Primary Examiner.*